Oct. 23, 1956 W. M. BOOTH 2,767,807
AIRLINE OILER FOR PNEUMATIC TOOLS
Filed June 16, 1954
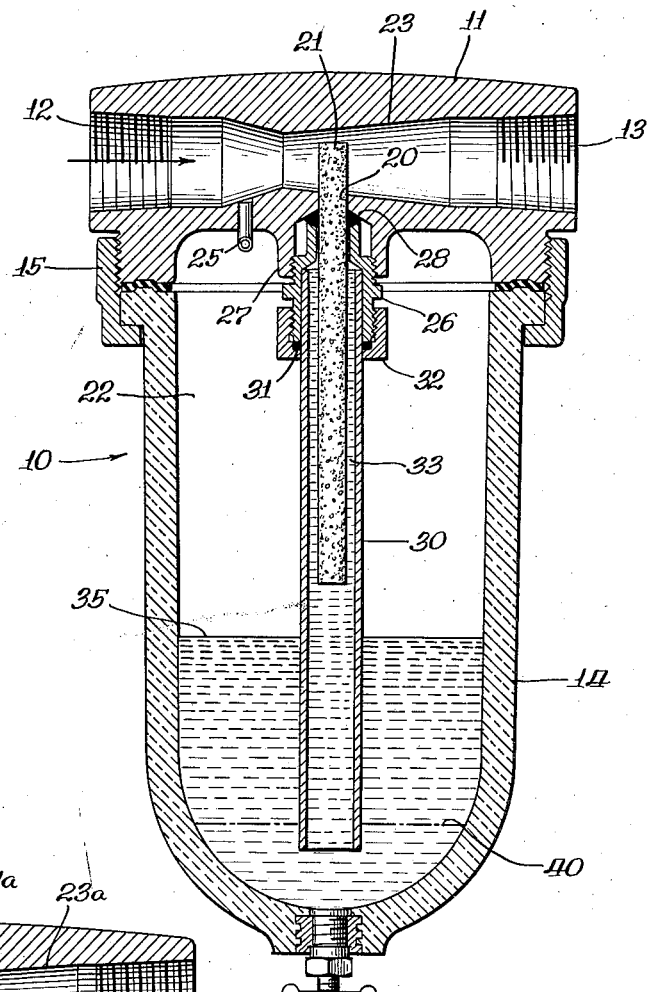
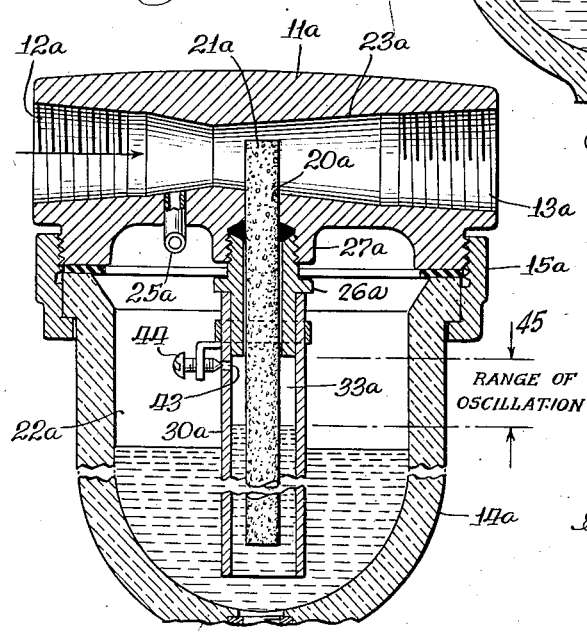
Inventor.
William M. Booth
By: Carlson, Pitner,
Hubbard & Wolfe
Attys.

United States Patent Office 2,767,807
Patented Oct. 23, 1956

2,767,807

AIRLINE OILER FOR PNEUMATIC TOOLS

William M. Booth, Spring Lake, Mich., assignor, by mesne assignments, to Gardner-Denver Company, a corporation of Delaware Application June 16, 1954, Serial No. 437,232

4 Claims. (Cl. 184—55)

The present invention pertains to improvements in airline oilers of the type in which lubricant is imparted in the form of a mist or foam to an air stream.

It is a general object of the present invention to provide an oiler having more consistent oil flow characteristics and a higher maximum rate of flow than oilers of the conventional type. It is a more specific object to provide an oiler in which the average rate of flow remains relatively constant in spite of changes in the level of the oil in the reservoir. It is another object to provide an oiler in which flow of oil into the air stream is positively induced and proportioned to the rate of flow of the air stream.

It is a further object to provide an airline oiler which is capable of producing a flow of oil reliably over long periods of time and which resists clogging due to impurities in the oil. It is a related object to provide an oiler which has a larger average wetted area than conventional oilers, an area which, in one form of the invention, remains perfectly constant until the oil in the reservoir has been substantially exhausted.

It is an object of the invention in another aspect to provide an oiler in which novel means are provided for adjusting the rate of flow. It is an object, more specifically, to provide an oiler in which the average wetted area may be varied to give a variable rate of oil flow. It is still another object to provide an oiler having an oil column which continuously oscillates back and forth during normal operation to give visual proof that oil is flowing into the air as well as an approximate indication of the rate of flow. The oscillation provides a certain amount of flushing action, tending to dislodge impurities from the wetted area. In a further aspect it is an object of the invention to provide means for adjusting the effective rate of oil flow which does not require any change in the effective obstruction provided in the air stream.

Other objects and advantages of the invention will become apparent upon studying the attached detailed description and upon reference to the drawings, in which:

Figure 1 is a vertical transverse section of an oiler constructed in accordance with the present invention.

Fig. 2 is a vertical transverse section showing a modified form of oiler and illustrating one of the aspects of the invention.

While the invention is shown and described herein in connection with two separate embodiments, it will be understood that I do not intend to limit myself to such embodiments, but intend to cover, on the contrary, all modifications and alternative constructions falling within the spirit and scope of the appended claims.

Turning now to Fig. 1, an oiler 10 is shown having a body 11 providing an inlet 12 and an outlet 13. Suspended below the body 11 is a bowl 14 held in place by a threaded retaining ring 15. Centrally arranged within the bowl and extending up into the body through an aperture 20 is sintered rod 21. The upper end of the rod, as shown, extends into the stream of air passing through the body of the oiler.

In order to create a pressure differential between the space 22 within the bowl and the upper end of the sintered rod 21, a venturi 23 is formed between the inlet 12 and outlet 13. The venturi is so located that the sintered rod is positioned on the down-stream side just beyond the throat. A vent 25 is provided in the up-stream side of the venturi to connect the air stream with the space 22 in the bowl.

Turning attention to the means for supporting the sintered rod 21, a threaded ferrule 26 is provided which is threaded into an annular flange 27 integrally formed on the under side of the body 11. A ring 28 of packing material is provided at the upper end of the ferrule 26. The ferrule and packing material together form an airtight gland and packing pressure may be increased simply by screwing the ferrule 26 tight. Conversely, sealing pressure may be removed by unscrewing the ferrule 26 to permit adjustment of the amount of the sintered rod 21 which is exposed to the air stream. In this connection, reference is made to the Myers Patent 2,515,417 which issued on July 18, 1950.

In accordance with the present invention, the sintered rod 21 is surrounded by a tube or sheath which is sealed at its top end and which extends downwardly to a point near the bottom of the bowl 14. In the present instance the tube or sheath indicated at 30 is fitted snugly inside of the ferrule 26. Air-tight sealing is insured by an O ring 31, which is squeezed into sealing contact with the tube and the ferrule by means of a threaded retaining ring 32.

Under operating conditions, oil of proper viscosity is placed in the bowl 14, the oil level being indicated at 35. Because of the passage of air through the venturi in the body of the oiler, a pressure differential is created between the vent 25, which is in communication with the bowl, and the upper end of the sintered rod 21. The magnitude of the pressure differential depends upon the design of the venturi and may in a practical case be on the order of one pound per square inch. This pressure differential, acting upon the surface of the oil, tends to force oil upwardly into the tube 30 into contact with the sintered rod 21. In accordance with one of the aspects of the present invention the inner diameter of the tube is greater than the diameter of the rod 21 so that an annular space 33 exists between the rod and the tube. Because of the differential pressure, oil is forced upwardly, completely filling the space 33 and completely wetting the depending portion of the sintered rod. This provides a large wetted area and therefore insures maximum flow of oil. It is to be particularly noted that the large wetted area remains constant in spite of the dropping of the level of the oil in the reservoir. For example, the level of the oil may fall to the level indicated at 40 without appreciably changing the oil flow characteristics. It will be apparent to one skilled in the art that the large amount of wetted area, in addition to enhancing the rate of flow, tends to reduce clogging due to minor impurities in the oil. Assuming, for example, that the wetted area were twenty times greater than the area of the lower tip of the rod 21, then the tendency toward clogging by a given amount of impurity would be reduced in about the same ratio.

In the embodiment shown in Fig. 1, the sintered rod 21 extends approximately half way to the bottom of the bowl 11. It will be apparent that where a larger wetted area is desired, the rod may be lengthened. Conversely, where a more limited flow of oil is required, a correspondingly shorter rod may be employed.

Experience with the present design of oiler has shown that the rate of oil flow is substantially in proportion to the rate of flow of the air stream. This insures that where a plurality of tools are supplied from the output, each tool will receive a measured quantity of oil.

While the airline oiler of Fig. 1 includes a number of features and advantages which distinguish it from prior oilers, the invention is, however, not limited thereto, but includes, in one of its aspects, a modified construction shown in Fig. 2. In this figure corresponding reference numerals with the subscript "a" have been employed to represent corresponding parts. It is one of the features of the device shown in Fig. 2 that a restricted bleeding connection is provided at the upper end of the tube 30a to connect the annular space 33a within the tube to the space 22a within the bowl. In the present instance such connection is provided by an orifice 43. Such orifice is preferably somewhat smaller than the orifice in the vent 25a so that the pressure which exists in the space 33a is less than the pressure within the bowl. If desired, the orifice 43 may be made adjustable by providing an adjusting screw 44, the tip of which may be pointed in the manner of a needle valve. Adjustment of the screw 44 permits variation in the differential pressure between the space 22 and the space 33 within the tube. By tightening down on the screw 44 the orifice 43 may be sealed so that the device works in the same fashion as the device shown in Fig. 1 to produce maximum oil flow. By providing an extremely large orifice 43, on the other hand, the effect of the tube 30a may be largely nullified with corresponding reduction in the flow. Rates of flow between these two extremes may be secured either by replacing the tube 30a with one having the desired intermediate orifice size or by appropriate adjustment of the adjusting screw 44.

It has been found that adjustment of the rate of flow of the oil may also be secured in the present embodiment by changing the size of the vent 25a, keeping the size of the orifice the same. It is to be noted, however, that the direction of change to produce a given effect in the rate of oil flow is the opposite of that which has been noted above in connection with the orifice 43. Thus, increasing the size of vent 25a tends to increase the flow of oil, while decreasing the size tends to reduce the flow. It would be apparent that the vent 25a may be provided with an adjusting screw similar to the adjusting screw 44.

It is one of the unusual features of the embodiment shown in Fig. 2 that the oil level does not remain constant but tends to oscillate up and down under steady state operating conditions. Thus, at the beginning of a cycle of oscillation the oil level rises within the space 33a within the tube. This process continues until the oil level extends beyond the orifice 43 and substantially to the upper end of the space 33a. The level dwells momentarily at this point and then drops within the tube about three-quarters of the distance to the oil level within the bowl, the range being indicated at 45 in the figure. The cycle then repeats as long as there is a flow of air through the oiler. The constant oscillation of the oil level within the tube gives a visual indication that the oiler is working properly provided, of course, that the tube 30a is made of plastic, glass or other transparent material. It is also found that frequency of the oscillation gives a rough indication of the rate of oil flow. This is to be contrasted with conventional oilers in which failure of the oiler gives no outward indication, thereby risking damage to expensive pneumatic tools. The oscillation of the oil level, although it occurs at a relatively low rate, nevertheless provides a certain amount of flushing action and tends to dislodge any loose particles of impurity which may collect on the upper portion of the sintered rod 21a within the tube.

The reason for the constant oscillation is the subject of continuing study. It appears, however, that when the orifice 43 is covered by a rising column of oil, the pressure within the bowl begins to rise, approaching that at the upper end of the vent 25a. Simultaneously, the pressure within the space 33a drops, more nearly approaching the pressure which exists at the upper end of the sintered rod 21a. When the differential pressure between the space 33a and the space 22a within the bowl becomes great enough, several air bubbles pass through the orifice 43. This reduces the differential, allowing the column of oil within the tube to drop to about one quarter of its original height after which the cycle is repeated.

In addition to the practical advantages brought about by the orifice 43, the oscillating column of oil provides a definite psychological advantage with sufficient novelty to provide a strong sales appeal.

The net effect of providing the orifice 43 is to enable variation in the average wetted area of the sintered rod 21a as well as the variation in the pressure utilized to positively induce flow of oil into the air stream. The adjustment in oil flow provided by adjusting the size of the orifice 43 or, alternatively, the size of vent 25a, makes it unnecessary to vary the height of the sintered rod 21a. With the height of the rod constant, the venturi characteristics also remain constant. This is advantageous since it permits operation with a permissible and known drop in line pressure for all rates of flow. It is to be noted, nevertheless, that provision is made in the embodiment of Fig. 2 to raise or lower the sintered rod 21a simply by unscrewing the ferrule 26a from the body of the oiler which, just as in the case of the embodiment shown in Fig. 1, relieves the sealing pressure and permits the rod to be moved endwise to a new position.

I claim as my invention:

1. In an airline oiler, the combination comprising a body having an air inlet and an air outlet interconnected by a venturi, a bowl providing oil chamber sealed to the under side of said body, a porous rod vertically arranged within said oil chamber and extending through the wall of said body to present the upper end thereof to the air stream in said venturi and extending downwardly at least to the central region of said oil chamber, a tube telescoped over said rod, said tube being substantially sealed relative to the oil chamber at its upper end and having its lower end terminating adjacent the bottom of the chamber, said body providing a vent for interconnecting the inlet side of the venturi to the oil chamber, said tube having an inner diameter which is greater than the outer diameter of the rod to provide an annular space for receiving oil in response to the pressure differential between the vent and the upper end of the rod.

2. In an airline oiler, the combination comprising a body having an air inlet and an air outlet interconnected by a venturi, a bowl providing an oil chamber sealed to the under side of said body, a porous rod vertically arranged within said oil chamber and extending through the wall of said body to present the upper end thereof to the air stream in said venturi, a tube telescoped over said porous rod, said tube being joined to the body at its upper end and having its lower end terminating adjacent the bottom of the oil chamber, said body providing a vent for interconnecting the inlet side of the venturi to the oil chamber, and said tube having an orifice adjacent the top end thereof to provide restricted communication between the chamber and the upper end of the rod.

3. In an airline oiler, the combination comprising a body having an air inlet and an air outlet interconnected by a venturi, a bowl providing an oil chamber sealed to the under side of said body, a porous rod vertically arranged within said oil chamber and extending through the wall of said body to present the upper end thereof to the air stream in said venturi, a tube telescoped over said porous rod, said tube being joined to the under side of said body at its upper end and having its lower end terminating adjacent the bottom of the oil chamber, said body providing a vent for interconnecting the inlet side of the venturi to the oil chamber, and said tube having an orifice in the wall thereof at a level substantially above the lower end of the porous rod.

4. In an airline oiler, the combination comprising a body having an air inlet and an air outlet interconnected by a venturi, a bowl providing an oil chamber sealed to the under side of said body, a porous rod vertically arranged within said oil chamber and extending through the wall of said body to present the upper end thereof to the air stream and extending downwardly at least to the central region of said oil chamber, a tube telescoped over said porous rod, said tube being substantially closed at its upper end and having its lower end terminating adjacent the bottom of the oil chamber, clearance being provided between the tube and the rod for admission of oil to the lateral surfaces of the rod.

References Cited in the file of this patent

UNITED STATES PATENTS

| | | |
|---|---|---|
| 1,948,479 | Caminez | Feb. 20, 1934 |
| 2,604,958 | Leufvenius | July 29, 1952 |
| 2,680,496 | Johnson | June 8, 1954 |